United States Patent [19]

Alam et al.

[11] Patent Number: 5,482,520
[45] Date of Patent: Jan. 9, 1996

[54] DERIVATIZED T-BUTYL CALIXARENE ENCAPSULATED CYANURIC ACID

[75] Inventors: Iftikhar Alam; Rodney L. D. Sung, both of Fishkill, N.Y.

[73] Assignee: Texaco Inc., White Plains, N.Y.

[21] Appl. No.: 262,123

[22] Filed: Jun. 17, 1994

[51] Int. Cl.$^6$ ............................................... C10L 1/22
[52] U.S. Cl. ........................... 44/336; 428/402; 544/219
[58] Field of Search ..................... 544/219; 44/336; 428/402

[56] References Cited

U.S. PATENT DOCUMENTS 5,199,959  4/1963  Sung et al. ............................ 44/336
5,219,955  6/1993  Sung et al. ............................ 525/516

*Primary Examiner*—Yogendra N. Gupta
*Attorney, Agent, or Firm*—Christopher Nicastri; Kenneth R. Priem; George J. Darsa

[57] ABSTRACT

The present invention provides a chemical composition comprising a t-butyl calix[8]arene encapsulated cyanuric acid derivatized with at least one $C_4$–$C_{50}$ n-alkyl halide, n-alkaryl halide, aryl halide or polyoxyalkylene halide.

6 Claims, No Drawings

DERIVATIZED T-BUTYL CALIXARENE ENCAPSULATED CYANURIC ACID

BACKGROUND OF THE INVENTION

1. Field of the Invention

This invention relates to a chemical method of decreasing nitric oxide, $NO_x$, levels, and more particularly to a composition of matter for reducing $NO_x$ levels in diesel fuels.

2. Description of Related Information

Nitrogen oxides are the oxidation products of elemental nitrogen, organic, or inorganic nitrogen and oxygen at elevated temperatures. Nitrogen oxides include: nitric oxide, NO; nitrogen dioxide, $NO_2$; nitrogen trioxide, $NO_3$; dinitrogen trioxide, $N_2O_3$; tetranitrogen pentaoxide, $N_4O_5$; tetranitrogen hexaoxide, $N_4O_6$; nitrous oxide, $N_2O$; and the like. The elevated temperatures required to prepare these nitrogen oxidation products are routinely obtained in internal combustion engines utilizing gasoline, diesel, or aviation fuel, and the $NO_x$, pollution from internal combustion engines continues to be a significant problem today.

There are very strong ecological and environmental reasons to reduce or eliminate $NO_x$ as an internal combustion oxidation product. For example, $NO_x$ is directly responsible for acid rain and photochemical smog. Moreover, chronic exposure to $NO_x$ has been directly linked with restricted pulmonary compliance in non-smoking healthy males and to acute respiratory disease among children living in "high exposure" towns in Czechoslovakia. $NO_x$ has also been identified as a key irritant cited for the high incidence of chronic bronchitis among Japanese postal workers servicing urban centers as outlined in Medical and Biologic Effects of Environmental Pollutants by the National Academy of Sciences, 1977.

Many physical methods have been suggested to reduce or eliminate. For example, U.S. Pat. No. 3,894,141 describes reacting $NO_x$ with liquid hydrocarbons; U.S. Pat. No. 4,405,587 describes burning $NO_x$ with a hydrocarbon at high temperature; U.S. Pat. No. 4,448,899 describes reacting $NO_x$ with an iron chelate; U.S. Pat. No. 3,262,751 describes reacting $NO_x$ with a conjugated diolefin; and U.S. Pat. No. 3,900,554 describes reacting a combination of ammonia and oxygen with nitric oxide. A drawback of these techniques is that they can involve a great deal of capital outlay and require major consumption of additives, and scrubbers, etc. Another drawback is that the reactions described can create organic pollutant disposal problems, and ammonia disposal problems, as well as create toxic and malodorous environments. Further drawbacks are that they require the presence of oxygen and are relatively expensive. Finally, these methods also require controlled environments which make them impractical if not impossible to use in mobile vehicles.

An object of the present invention is to provide an economical means for reducing $NO_x$ in diesel exhaust. A further object of the present invention is to provide a means for reducing $NO_x$ in diesel exhaust which can be used in a motor vehicle. A further objective of the present invention is to provide a chemical composition which can be added to diesel fuel to achieve reduction of $NO_x$ in diesel exhaust.

Back et al., Can. J. Chem. 46,531 (1968), discloses the effect of nitric oxide on the photolysis of isocyanic acid, HNCO, the decomposition product of cyanuric acid. An increase of nitrogen concentration in the presence of large amounts of nitric oxide was observed when nitric oxide came in contact with isocyanic acid or the photolysis product of HNCO. The increased concentration of nitrogen was attributed by the authors directly to nitric oxide level reduction.

Furthermore, use of cyanuric acid as a source of isocyanic acid for purposes of studying various properties of the latter or its subsequent degradation products is well known in the art. See, for example, Okable, J. Chem. Phys., 53, 3507 (1970) and Perry, J. Chem. Phys. 82,5485 (1985).

SUMMARY OF THE INVENTION

The present invention provides a chemical composition comprising a t-butyl calix[8]arene encapsulated cyanuric acid derivatized with at least one of n-alkyl halide, n-alkaryl halide, aryl halide or polyoxyalkylene halide. In addition the present invention provides a derivatized t-butyl calix[8] arene encapsulated cyanuric acid produced by the steps comprising reacting t-butyl calix[8]arene with a halo-s-triazine to form a t-butyl calix[8]arene encapsulated cyanuric acid and derivatizing the t-butyl calix[8]arene encapsulated cyanuric acid with a derivatizing agent comprising at least one of n-alkyl halide, n-alkaryl halide, aryl halide or a polyoxyalkylene halide to form the derivatized t-butyl calix[8]arene encapsulated cyanuric acid.

DESCRIPTION OF THE INVENTION

The composition of matter of the present invention, when used as an additive in diesel fuel, provides a means for introducing isocyanic acid, HNCO, into the exhaust stream of a diesel engine, where it reacts with $NO_x$ to form innocuous gases, i.e., $N_2$, $H_2O$ and $CO_2$.

Isocyanic acid is a reducing agent known for its ability to reduce $NO_x$ to innocuous gases, i.e., $N_2$, $H_2O$ and $CO_2$. It cannot be added directly to diesel fuel as an additive, however, because it is not soluble in diesel fuel. Applicants have discovered a new composition of matter that is soluble in diesel fuel and which breaks down both during and after combustion of the diesel fuel to provide free isocyanic acid in the exhaust gases.

In general, the composition of matter of the present invention can be produced as follows:

p-tert-butyl calix[8]arene, represented by the formula:

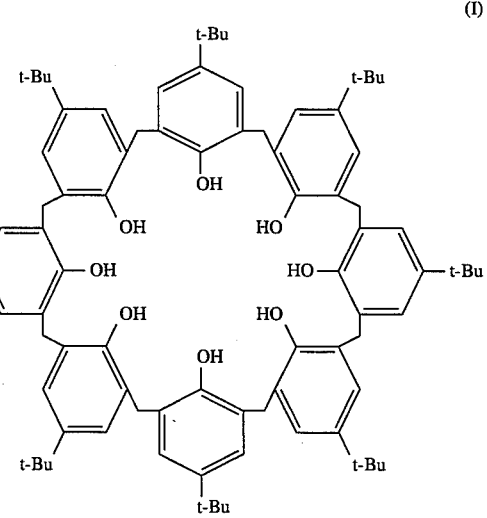

(I)

is reacted with a halo-s-triazine, i.e., a halogen substituted trimer of isocyanic acid, represented by the formula:

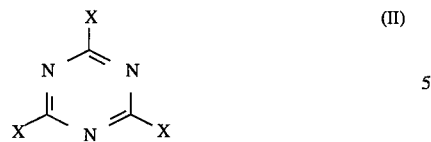
(II)
in the presence of a base to form a p-tert-butyl calix[8]arene encapsulated cyanuric acid comprising one or more of the compounds represented by the following three formulas:
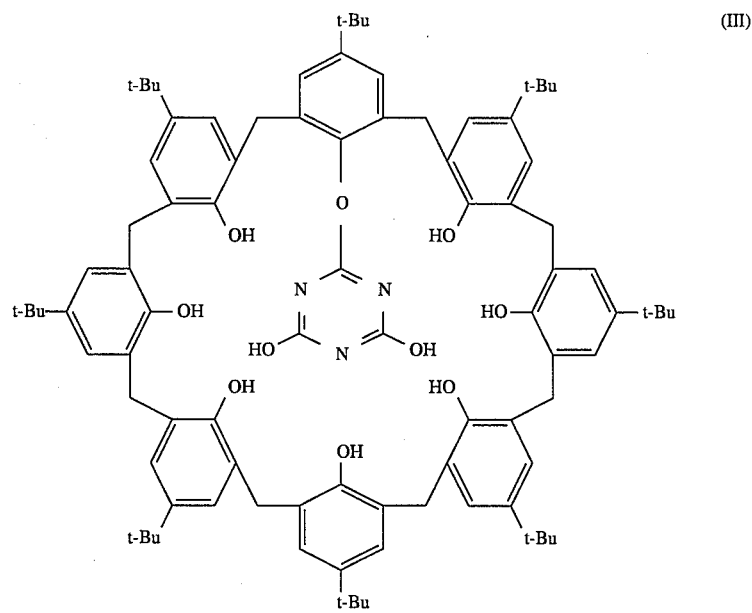
(III)
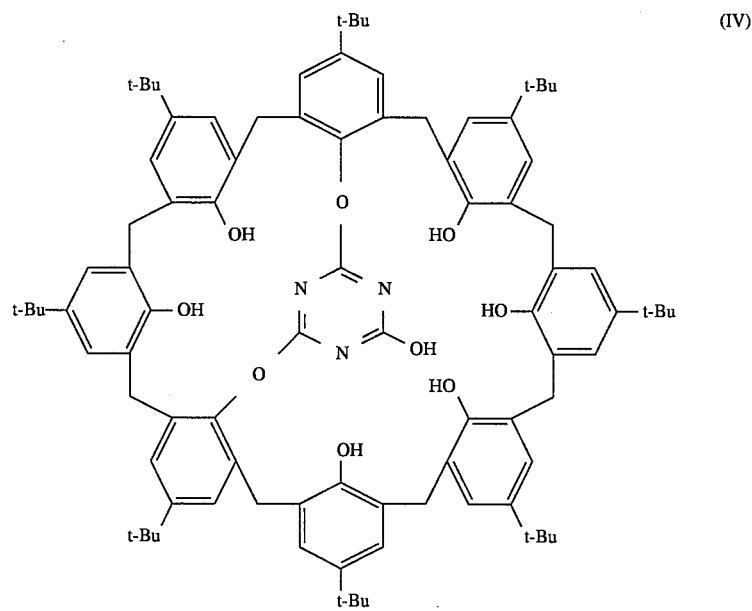
(IV)

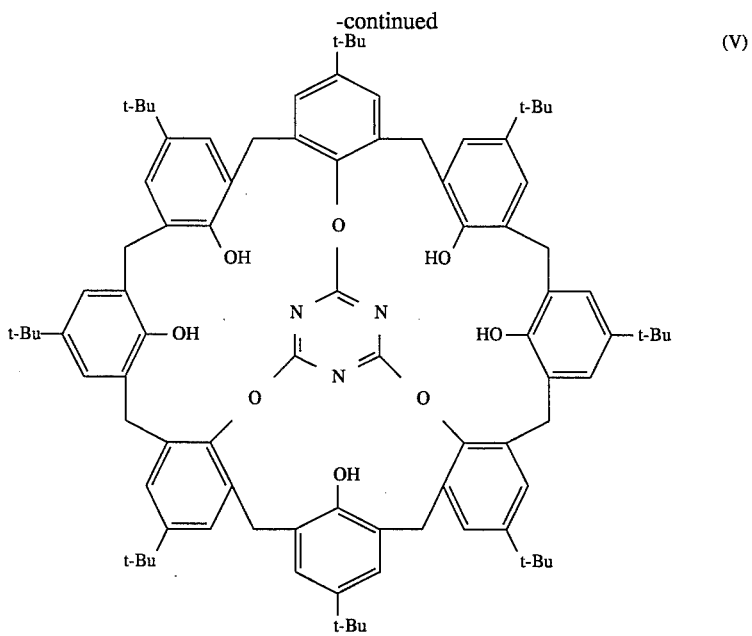

(V)

The calix[8]arene encapsulated cyanuric acid is then derivatized with a derivatizing agent comprising n-alkyl halide, n-alkaryl halide, aryl halide or polyoxyalkylene halide moieties, in the presence of a base.

The reactants and the synthesis are described in more detail as follows:

t-Butyl calix[8]arene t-Butyl calix[8]arene can be purchased from Petrolite, located in St. Louis, Mo. and can be synthesized by the following procedure:

t-Butyl calix[8]arene is a complex molecule prepared by reacting para-t-butylphenol with para-formaldehyde, in the presence of a catalytic amount of a base, and a solvent. The reactants are employed with a slight stoichiometric excess of p-formaldehyde, preferably about 1.2 moles per mole of p-t-butylphenol. This allows for some loss of the p-formaldehyde due to evaporation. In a typical preparation, the reaction charge is about 1 to about 20 moles of t-butylphenol, e.g., about 11.7 moles, about 1 to about 20 moles of paraformaldehyde, e.g., about 13.3 moles, about 0.01 to about 1.0 moles of NaOH, e.g., about 0.35 moles, and about 100 ml to about 10,000 ml of solvent, e.g., about 6000 ml a non-polar solvent. The reaction mixture is refluxed for about 1 to about 10 hours, e.g., about 4 hours. Yield is about 70%. The product is filtered and washed with a polar solvent, preferably acetone. The product is primarily t-Butyl calix[8]arene, which, as depicted in Formula I above, is an eight membered ring structure made from repeating tert-butyl phenol groups. It can contain small quantities of t-Butyl calix[4]arene, t-Butyl calix[6]arene, and t-Butyl calix[10]arene, which are analogous four, six and ten membered ring structures. These can be present collectively in an amount of about 2–3% of the total product yield.

A preferred solvent for the synthesis of p-t-butyl calix[8] arene is one which will distill with water azeotropically. Suitable solvents include hydrocarbons boiling in the gasoline boiling range of about 30° C. to about 200° C. Generally this will include saturated and unsaturated hydrocarbons having from about 5 to about 10 carbon atoms. Specific suitable hydrocarbon solvents include cyclohexane, benzene, toluene, and xylene. Xylene, comprising one or more of the para, ortho, or meta isomers is the preferred solvent. The solvent can be present up to 90% of the reaction mixture.

Any base suitable for producing calix[8]arene can be used. Preferably the base is LiOH, KOH, NaOH, Ba(OH)$_2$, Ca(OH)$_2$, or Al(OH)$_3$. A more preferred base is NaOH.

Halo-s-Triazine

The halo-s-triazine useful in preparing the composition of matter of the present invention can be mono-, di- or tri-substituted, and the useful halogens are fluorine, chlorine, bromine and iodine. The tri-substituted compound is preferred, and chlorine is preferred. These are commercially available from Aldrich Chemical Company, Milwaukee, Wis.

Derivatizing Agent

Compounds useful as derivatizing agents for derivatizing the encapsulated cyanuric acid intermediate can be $C_4$–$C_{50}$, preferably $C_6$–$C_{16}$, n-alkyl halides, n-alkaryl halides, or polyoxyalkylene halides. The preferred derivatizing agents are n-alkyl halides and n-alkaryl halides moieties, where the halogen is bromine. For example, the derivatizing agents can be benzyl bromide, n-octyl bromide, polyoxypropyl bromide or, preferably, n-dodecyl bromide.

Synthesis of Alkyl Halide Derivatized t-Butyl Calix[8]arene Encapsulated Cyanuric Acid One mole of the t-butyl calix[8]arene is reacted with about 1 to about 8 moles of a base, e.g., about 2 moles, preferably KOH, and about 0.1 to about 1 mole of halo-s-triazine, e.g., about 0.9 moles, in about 1 to about 10 liters of a polar solvent, preferably acetone, e.g., 5 liters of acetone. The mixture is stirred for about 1 to about 6 hours, e.g., about 3 hours, at a temperature of about 20 to about 60° C., e.g., 25° C. The product is t-butyl calix[8]arene encapsulated cyanuric acid. Note that because the t-butyl calix[8]arene reagent typically contains some 4, 6, and 10 membered calixarenes, this intermediate product, and the final product as well, will contain some 4, 6, and 10 membered calixarenes.

The t-butyl calix[8]arene encapsulated cyanuric acid is then added to 1–10 moles of a base, e.g., 6 moles of a base, preferably KOH, and then added to an alkyl halide in a solvent. The t-butyl calix[8]arene encapsulated cyanuric acid and the derivatizing agent are reacted in a ratio between about 1:4 and about 1:6, respectively. The reaction mixture is then heated to refluxing temperature. About 1 to about 10 moles of t-butyl calix(8)arene encapsulated cyanuric acid, e.g., 1 mole, is reacted with about 1 to about 10 moles of an alkyl halide, e.g., 5 moles, preferably dodecyl bromide for about 6 to about 72 hours, e.g., about 48 hours. The derivatizing agents bond to one or more of the hydroxyl groups remaining on the calix[8]arene encapsulated cyanuric acid, imparting diesel fuel solvency to the compound. The longer the alkyl chains of the alkyl halide, the fewer moles of alkyl halide which will be needed to react with the t-butyl calix[8]arene encapsulated cyanuric acid to provide it with diesel fuel solvency. The preferred solvent is acetone. The solvent is removed by distillation, and the resulting product mixture is dissolved in 1–10 liters of solvent, e.g., 2.5 liters of xylene. The solution is filtered. The product is the derivatized t-butyl calix[8]arene of the present invention.

The following Examples are provided to illustrate the present invention.

EXAMPLE I

Synthesis of t-butylcalix[8]arene 11.7 moles of t-butylphenol and 20 moles of paraformaldehyde were refluxed in 6000 ml xylene in the presence of 0.35 moles of sodium hydroxide for four hours. The product was filtered, dried and purified by washing with acetone. The structure of the product was confirmed by high pressure liquid chromatography (HPLC) and nuclear magnetic resonance (NMR).

EXAMPLE II

Synthesis of t-butyl calix[8]arene encapsulated cyanuric acid

One mole of t-butylcalix[8]arene was dissolved in 4000 ml of acetone in the presence of 1.4 equivalents of potassium hydroxide and reacted with one equivalent of cyanuric chloride. After stirring for one hour, another 2 equivalents of potassium hydroxide were added and refluxed for four hours. The product was filtered and washed with acetone. The structure of the product was confirmed by HPLC and NMR.

EXAMPLE III

Synthesis of benzyl chloride derivatized t-butyl-calix[8]arene encapsulated cyanuric acid One mole of t-butylcalix[8]arene encapsulated cyanuric acid and 6 moles of benzyl chloride were refluxed in acetone in the presence of potassium hydroxide for 12–16 hours. Acetone was removed by distillation and the resulting product was dissolved in enough xylene to make it 30 wt % solution in xylene. Structure of the product was confirmed by HPLC and NMR.

EXAMPLE IV

Synthesis of chlorooctane derivatized t-butyl-calix[8]arene encapsulated cyanuric acid One mole t-butyl-calix[8]arene encapsulated cyanuric acid and 6 moles 1-chlorooctane were refluxed in acetone in the presence of 6 moles potassium hydroxide for 12–16 hours. Acetone was removed by distillation. The structure of the product was confirmed by HPLC and NMR.

EXAMPLE V

Synthesis of 1-bromodecane derivatized t-butylcalix[8]arene encapsulated cyanuric acid One moles t-butylcalix[8]arene encapsulated cyanuric acid and 6 moles 1-bromodecane were refluxed in acetone in the presence of potassium hydroxide for 12–16 hours. Acetone was removed by distillation. Structure was confirmed by HPLC and NMR.

The products of Examples II–V were tested to confirm incorporation of the cyanuric acid into the calixarene, to determine solubility of the encapsulated samples in diesel fuel and thermal stability of neat samples.

Table I indicates the results the fourier transform infrared analysis of cyanuric acid and the products of Examples II–V.

TABLE I

| | Detection Of Encapsulated Hydroxyl-S-Triazine | | | |
|---|---|---|---|---|
| Example | phenolic OH stretch (cm$^{-1}$) | phenolic OH deformation (cm$^{-1}$) | cyanuric acid OH stretch (cm$^{-1}$) | cyanuric acid OH deformation (cm$^{-1}$) |
| cyanuric acid | — | — | 3203 | 1390 |
| II | 3235 | 1237 | 3215 | 1364 |
| III | 3044 | 1238 | 3193 | 1362 |
| IV | 3318, 3196 | 1238 | 3196 | 1363 |
| V | 3333, 3183 | 1237 | 3204 | 1378 |

All FTIR evaluations for experimental samples were produced using tetrahydrofuran as the solvent and NaCl discs. FTIR analysis of cyanuric acid was performed by suspending the samples in Nujol mineral oil, a mixture of hydrocarbons used to make a mull.

In Table II below, the high pressure liquid chromatography column used for the analysis was non-polar (Econosphere) reverse phase using a sample concentration of 50 mg/50 mls THF. The injection volume was 10 microliters and a detection wavelength was 280 nm was used for all samples.

TABLE II

| Summary Of Peak Detection Of Experimental Samples Using HPLC | |
|---|---|
| Sample Mixture | Components Detected |
| Example I | 1 |
| Example II | 2 |
| Example III | 5 |
| Example IV | 6 |
| Example V | 5 |

TABLE III

Maximum Solubility of Encapsulated Cyanuric Acid in t-Butylcalixarenes

| Example | Solute Concentration at Turbidity Point (wt %) |
|---------|-----------------------------------------------|
| II      | <0.1%                                         |
| III     | <1%                                           |
| IV      | 1%                                            |
| V       | >5%                                           |

Thermal decomposition tests for Examples II–V show them to decompose at 50% level at >400° C.

We claim:

1. A chemical composition comprising a derivatized t-butylcalix[8]arene encapsulated cyanuric acid wherein the t-butyl calix[8]arene encapsulated cyanuric acid is derivatized with at least one $C_4$–$C_{50}$ n-alkyl halide, n-alkaryl halide, aryl halide or polyoxyalkylene halide.

2. The composition of matter of claim 1 where the t-butyl calix[8]arene encapsulated cyanuric acid is derivatized with at least one $C_6$–$C_{16}$ n-alkyl halide, n-alkaryl halide, aryl halide or polyoxyalkylene halide.

3. The composition of matter of claim 1 where the n-alkyl halide is 1-bromodecane.

4. The composition of matter of claim 1 where the n-alkyl halide is 1-chlorooctane.

5. The composition of matter of claim 1 where the aryl halide is benzyl chloride.

6. The chemical composition of claim 1 where the t-butyl calix[8]arene encapsulated cyanuric acid is derivatized by reacting it with at least one $C_4$–$C_{50}$ n-alkyl halide, n-alkaryl halide, aryl halide or polyoxyalkylene halide in a mole ratio of about 1:4 to about 1:6.

* * * * *